March 10, 1959 P. H. MEYER 2,877,014
INTERLEAVING APPARATUS
Filed Oct. 5, 1953 4 Sheets-Sheet 4

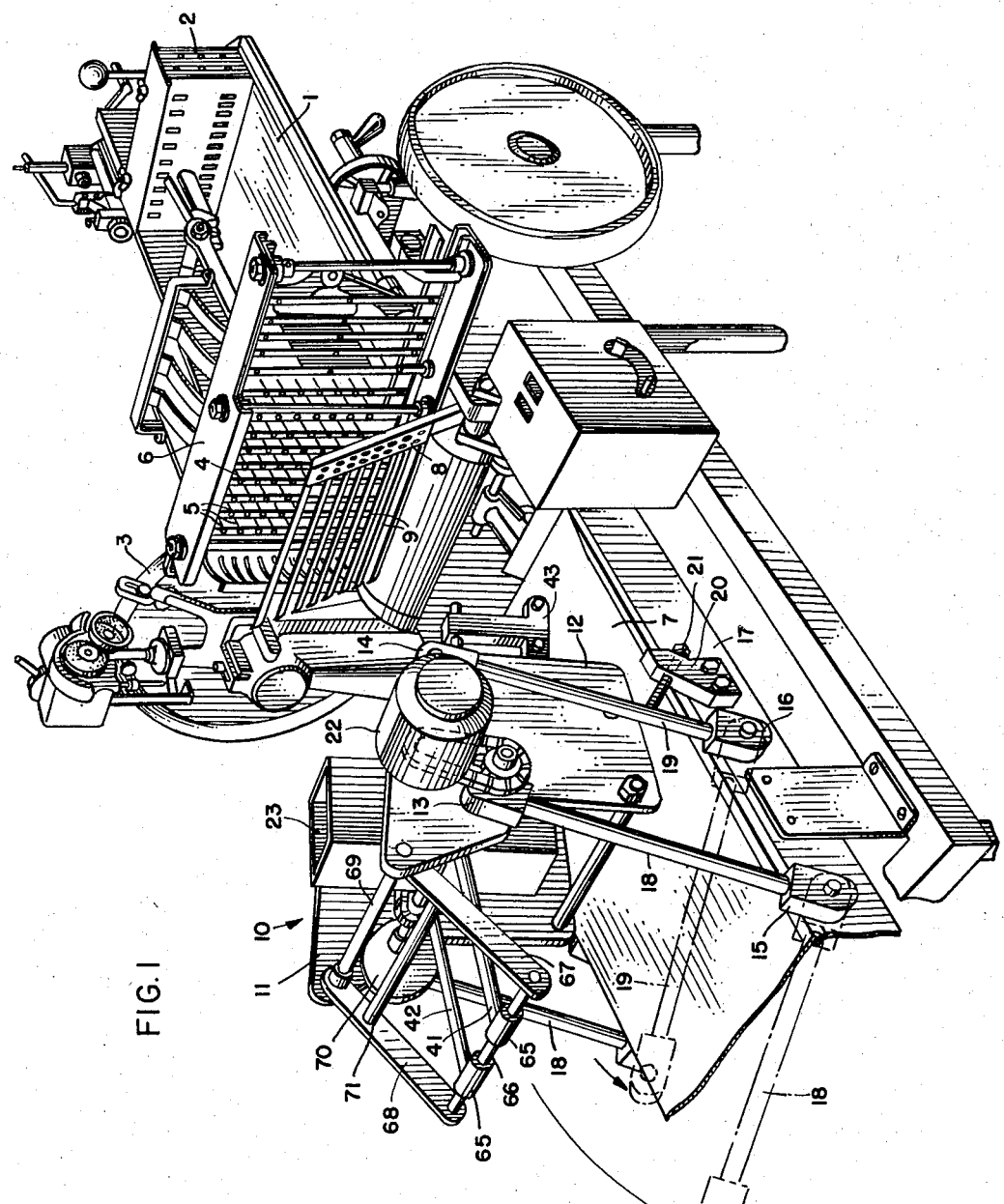

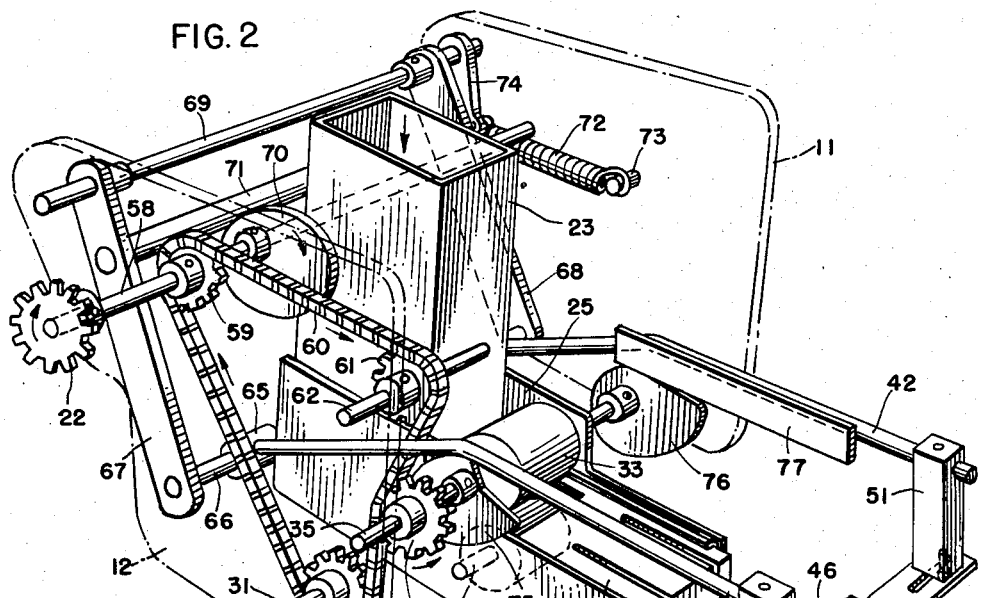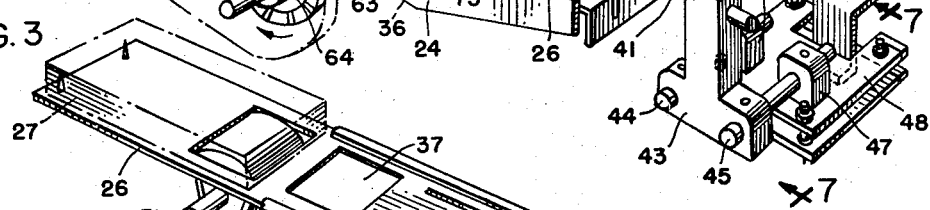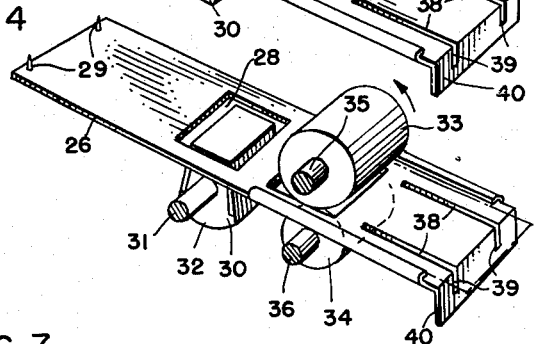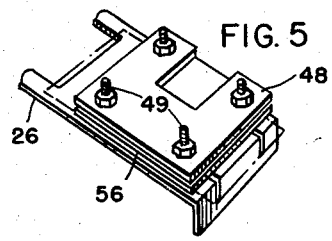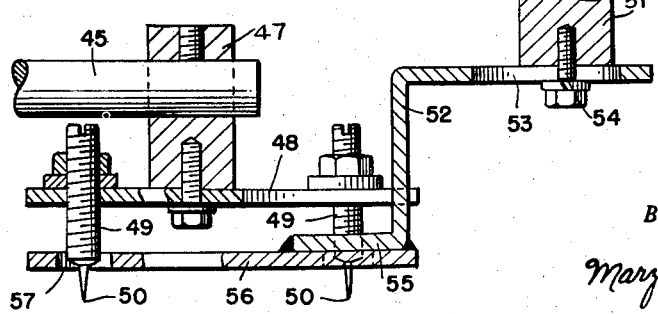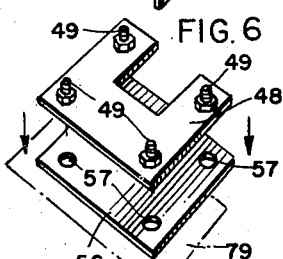
INVENTOR:
PAUL H. MEYER

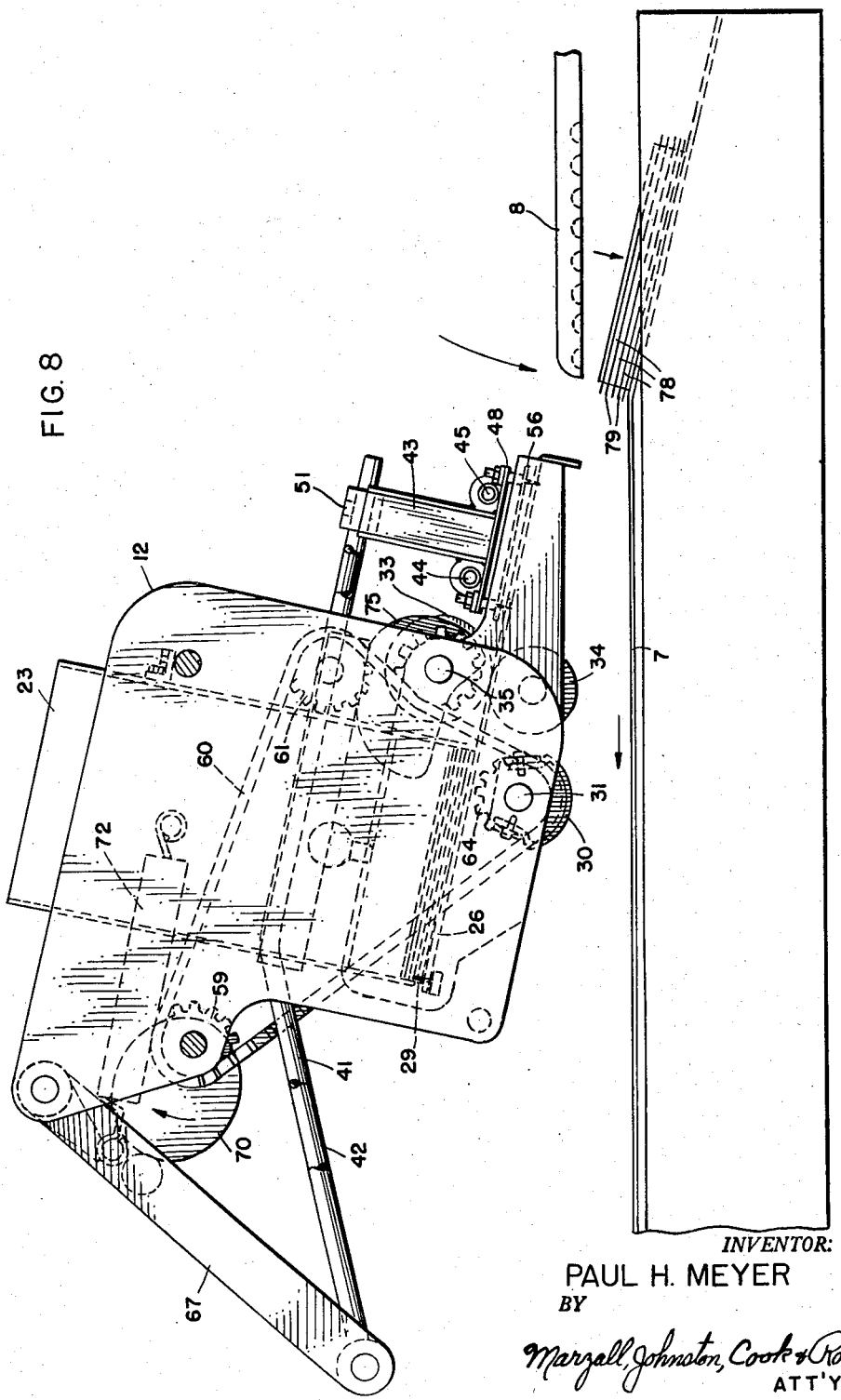

*INVENTOR:*
PAUL H. MEYER
BY
*Marzall, Johnston, Cook & Root.*
ATT'YS

United States Patent Office 2,877,014
Patented Mar. 10, 1959

2,877,014

INTERLEAVING APPARATUS

Paul H. Meyer, La Porte, Ind., assignor to U. S. Slicing Machine Company, Inc., La Porte, Ind., a corporation of Indiana Application October 5, 1953, Serial No. 384,099

8 Claims. (Cl. 271—10)

This invention relates in general to the preparation for packaging of slices of a food product such as cheese, and is particularly directed to an interleaving apparatus to deliver and deposit divider leaves of a flexible material between the slices.

Although the apparatus embodying the present invention is adapted for use in connection with the packaging of any sliced food product, it is of particular importance with respect to the packaging of sliced cheese. Sliced cheese has a tendency when the slices are placed in contact with each other in a package to coalesce or cohere to each other to a considerable degree, thus making it difficult, if not impossible at times, to separate the slices after the package has been opened.

It is therefore the principal object of the present invention to provide an apparatus for depositing leaves of a flexible material, such as paper or a thin plastic material, between the slices of a food product.

Another object of the invention is to provide an interleaver for inserting between the slices of a food product a leaf of a flexible material during the period of time that the product is being sliced.

A further object of the invention is to provide an apparatus adapted to be associated with a food substance slicing machine wherein suitable means are provided to withdraw a flexible sheet of dividing material from the bottom of a stack and deposit the same on each slice as it is being stacked on the conveyor of the slicing machine.

Still another object of the invention is to provide an interleaving apparatus wherein a stack of leaves of a flexible material is disposed above the conveyor of a slicing machine and wherein suitable mechanism withdraws the bottom leaf from the stack and deposits it on each slice as the slices are stacked.

A still further object of the invention is to provide an interleaving apparatus wherein a reciprocating pickup device is adapted to pick up a leaf of flexible material which has been fed thereto from the bottom of a stack and deposit the leaf on top of a slice of material positioned adjacent thereto by the operating mechanism of a slicing machine.

Another object of the invention is to provide a modified form of interleaving apparatus where at least a part of the apparatus is swingably mounted and is adapted to swing toward a slice of material positioned adjacent thereto for depositing a dividing leaf thereon and which then swings in the opposite direction during the period of time that another slice is being placed thereon.

Other objects and advantages of the invention will become apparent upon reading the following description taken in conjunction with the accompanying drawings in which:

Fig. 1 is a perspective view of a form of slicing machine which is adapted to have the interleaving apparatus of the present invention applied thereto;

Fig. 2 is a perspective view of an interleaving apparatus embodying a preferred form of the present invention;

Fig. 3 is a fragmentary perspective view of the platform which supports the stack of leaves and the intermittent feeding means for feeding a leaf from the bottom of the stack;

Fig. 4 is a perspective view similar to Fig. 3 but showing the intermittent feeding means in a non-feeding position and illustrating also the feed rolls which feed the leaf to the pickup device;

Fig. 5 is a fragmentary perspective view of the parts embodying the pickup device and illustrating the parts in their position at the time of picking up a leaf;

Fig. 6 is a perspective view of the parts shown in Fig. 5 but illustrating these parts in their position at the time of depositing a leaf on a slice;

Fig. 7 is a fragmentary enlarged transverse sectional view through the pickup device and taken along the plane of line 7—7 of Fig. 2;

Fig. 8 is an enlarged side elevational view of the interleaving apparatus showing a portion of the conveyor with which it is associated;

Figure 9:
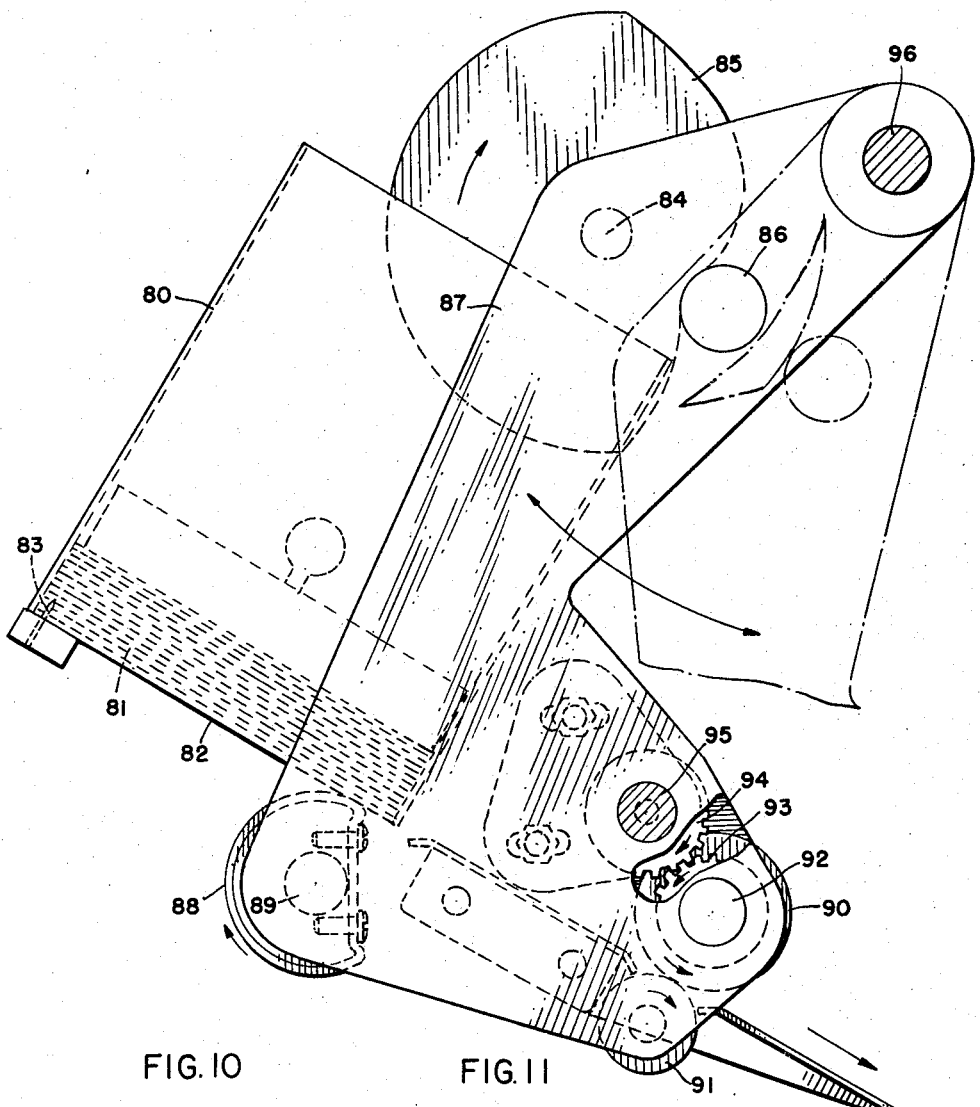
Fig. 9 is a side elevational view of a modified form of interleaving apparatus.

The apparatus embodying the present invention is adapted for use in connection with a slicing machine of the type wherein a substance is fed to a slicing knife to be sliced thereby and each slice is then deposited in a stack on an intermittently moving conveyor. Suitable adjusting mechanism is commonly employed in machines of this type to automatically move the conveyor after a predetermined number of slices has been placed thereon in stacked relation. The slicing machine illustrated in Fig. 1 of the drawings is one presently on the market, the operation of which is well known to those skilled in the art. Only general reference will therefore be made to the slicing machine itself in order that the application of the present invention thereto may be more clearly understood.

In general the slicing machine comprises a food table 1 on which the substance to be sliced is placed and a pusher member 2 adapted to feed the substance to a rapidly rotating slicing knife rotatably mounted within a housing 3. In this particular form of slicing machine a rack 4 having a plurality of sharp fingers 5 thereon is adapted to reciprocate and to pass from one side of a support 6 to the other side thereof. The vertical members of the rack 4 are secured together in a chain-like manner so that the fingers 5 may have the slice of food substance impinged thereon as soon as it is sliced and thereafter carry the slice around to the opposite side of the support 6 facing the conveyor 7. An oscillating paddle 8 has a plurality of arms 9 thereon and oscillates between two extreme positions. This paddle is shown in Fig. 1 in an intermediate position as it is moved upwardly toward the support 6. When it leaves its uppermost vertical position the sharp fingers 5 on the rack 4 will have been moved to a position facing the conveyor 7 with the slice in front of the paddle 8. The paddle 8 will thereafter move downwardly, carrying the slice with it, to deposit the slice on the conveyor 7. This operation is repeated continuously until a predetermined number of slices has been stacked, whereupon the conveyor will move away from the machine to make room for the next stack of slices.

The interleaving apparatus is generally indicated by the numeral 10 and is shown as being pivotally mounted at opposite sides of the conveyor 7 and positioned thereabove. This device consists of a framework which includes the side plates 11 and 12, each of which is provided with a pair of pivotally mounted bearing members 13 and 14. A like pair of pivotally mounted bearing members 15 and 16 is mounted on the side frame 17 of the conveyor 7 and these upper and lower bearing members are connected by rods 18 and 19.

The entire interleaving apparatus is supported on these rods so that the apparatus may be moved to the position shown in Figs. 1 and 8 over the conveyor into operative relationship with the positioning of the stacked slices, or may be moved rearwardly out of the way of the slices to the dot-dash line position shown in Fig. 1. If desired, a suitable bracket 20 may also be mounted at each side of the conveyor on the framework 17 and may be provided with an adjusting screw 21 extended therethrough and against which the forward rods 19 may rest when the apparatus is in its operative position. A suitable motor 22 may be mounted on one of the side frame plates for a source of power for driving the apparatus or any other suitable means desired may be utilized.

Referring now more particularly to Figs. 2 to 7 inclusive, wherein Fig. 2 illustrates a general assembly of the apparatus with the side frame plates 11 and 12 in phantom, it will be seen that a magazine 23 is mounted within the framework between the side plates 11 and 12 for the reception of a stack of leaves formed of a flexible material such as paper or thin sheets of a plastic material. The magazine 23 is supported on a framework consisting of the side plates 24 and 25 and an elongated platform member 26 disposed between the side plates 24 and 25.

The stack of leaves is shown in phantom in Fig. 3 and is identified by the numeral 27. This stack rests on the rear portion of the platform 26 and the bottom leaf thereof extends over an opening 28 in the platform 26. The rear edge of the platform is provided with a pair of pins 29 extending upwardly therefrom which are adapted to extend through a plurality of the lowermost leaves in the stack to prevent more than one leaf from being withdrawn from the bottom of the stack each time the friction feed means comes into contact therewith.

In this preferred form of the invention a segment of a friction roller 30 is utilized as the feed means. This feed roller 30 is mounted on a shaft 31 journaled for rotation at its ends in the side frame plates 11 and 12. As the feed roller 30 rotates, the arcuate friction surface 32 thereon will project upwardly through the opening 28 a sufficient distance to frictionally engage the lowermost leaf of the stack and will turn this leaf away from the retaining pins 29 and feed the sheet toward the supplementary feed rollers 33 and 34. The supplementary feed roller 33 is mounted on a shaft 35 also journaled for rotation at its ends in the side plates 11 and 12. Roller 33 is a driving roller, whereas roller 34 mounted on shaft 36 is an idler roller and rotates only by virtue of its contact with driving roller 33. The driving roller 33 is disposed above an opening 37 in the platform 26 and the idler roller 34 is mounted below opening 37 and in contact with roller 33. When the initial feed roller 30 rotates to initially remove the lowermost leaf from the stack 27, this leaf will be moved toward the rollers 33 and 34 which will pick up the leading edge of the leaf and feed it forwardly.

The forward end of the platform 26 is provided with a pair of parallel elongated slots 38, one at each side of the platform 26. Each slot 38 at its outer end is continued downwardly as at 39 through a down-turned flange 40 at the forward end of the platform 26. The purpose of these slots will become more apparent hereinafter, but for the present it is sufficient to state that they cooperate with the pickup device to enable the leaf to be transferred from the platform to the food slice located adjacent thereto.

A pickup device for transferring the leaves successively as they are delivered to the forward end of the platform 26 includes an arm 41 at one side of the magazine 23 and a second arm 42 extending forwardly from the apparatus at the opposite side of the magazine. Although these two arms may operate independently of each other, they cooperate to cause the pickup members mounted thereon to function in the desired manner.

The pickup device in general includes a pickup member and a stripper member. The pickup member is mounted on the forward end of arm 41 by means of an adjustable bracket 43 which is mounted for adjustment longitudinally of the arm 41. Supporting rods 44 and 45 are supported at one end thereof on the bracket 43 and at their outer ends support collars 46 and 47. These collars may be shifted longitudinally of the rods 44 and 45 for suitable adjustment.

A plate member 48 is secured to the adjustable collars 46 and 47 and has secured thereto a plurality of downwardly extending needle members 49. In the embodiment shown there are four such needle members 49 suitably mounted for adjustment in the plate 48 and which extend downwardly and terminate in sharp pointed ends 50 so that they may pierce successive leaves and pick them up for transfer to a sliced food product.

The stripper assembly includes a support 51 mounted on the arm 42 for adjustment longitudinally thereof. Another bracket 52 is mounted on the lower end of support 51 by means of a slot 53 in the bracket 52 and a bolt 54. This bolt and slot connection permits transverse adjustment of the stripper member.

The bracket 52 extends downwardly and then inwardly as at 55 and has secured thereto, such as by welding or otherwise, a stripper plate 56. The stripper plate 56 is disposed below the pickup plate 48 and is provided with openings 57 therein below each needle member 49 to permit relative movement between the plates 48 and 56. In the embodiment shown the stripper plate 56 is caused to move downwardly and strip the leaf from the needle members of the pickup device. Since the device is positioned at this time immediately above a slice, the leaf will thereupon be deposited on the slice after which the pickup device is again removed rearwardly, and while the next leaf is being picked up another food slice will be deposited on the preceding leaf.

The source of power, such as a motor, has been indicated by the numeral 22 and it is connected for directly driving a drive shaft 58 mounted for rotation in the side plates 11 and 12. A sprocket 59 is mounted on the shaft 58 for rotation therewith and drives the other parts of the apparatus by means of a sprocket chain 60 in engagement with other sprockets on the various shafts. A sprocket wheel 61 is an idler sprocket and is mounted for rotation on the shaft 62. The chain 60 passes around this sprocket 61 and then around another sprocket 63 mounted on shaft 35 for driving the supplementary feed roller 33. The chain 60 then passes around another sprocket wheel 64 mounted on shaft 31 for driving the intermittent feed roller 30. Thus far it will be clear that the driving means for the drive shaft 58 will cause a counterclockwise rotation of the supplementary feed roller 33 and a clockwise rotation of the intermittent feed roller 32.

The arms 41 and 42 on which the pickup device is mounted extend rearwardly to a sleeve 65 mounted on a crossbar 66. The arms 41 and 42 are thus free to move in a substantially vertical plane.

The crossbar 66 is secured at its ends to a pair of spaced supporting bars 67 and 68 at opposite sides of the apparatus, which bars are mounted for pivotal movement on a crossbar 69. Oscillating movement of the supporting bars 67 and 68 will cause the arms 41 and 42 of the pickup device to reciprocate longitudinally in a back and forth motion. To accomplish this oscillation of the bars 67 and 68 there is provided a cam 70 mounted on the drive shaft 58 which bears at its edge against a cam bar 71 also secured to the supporting bars 67 and 68. Thus when the drive shaft rotates the cam 70, it will cause the pickup device to be moved between the rearmost position thereof, shown in Fig. 8, and the forward position thereof, shown in Fig. 2. A coiled spring 72 is secured to the frame of the apparatus at one end thereof by means of a pin 73 and at its other end to an arm 74 fixed to the shaft 69. The spring 72 therefore will at all times urge the pickup device to its forward position and will maintain the cam bar 71 in contact with cam 70.

The two members of the pickup device are caused to reciprocate with respect to each other by means of cams secured to the shaft 35. Cam 75 is mounted on shaft 35 for contact with arm 41 while cam 76 is mounted on shaft 35 for contact with arm 42 or with a cam bar 77 mounted thereon.

The designs of these cams are such that both of them will allow the pickup device to move downwardly so that the needles thereof will pierce the leaf in the position shown in Fig. 8 and will thereafter cause relative movement between the pickup plate 48 and the stripper plate 56 to strip the leaf from the needles when in the position shown in Fig. 2. Figs. 5 and 6 will illustrate more clearly this latter movement where Fig. 5 shows the two plates in the pickup position and Fig. 6 shows the two plates separated with the leaf having been stripped from the needles.

Fig. 8 illustrates the forward end of the conveyor 7 as having an inclined portion onto which the slices 78 are deposited in succession by the delivery paddle 8. There is also illustrated a leaf 79 disposed between adjacent slices 78. In operation then, this preferred form of the invention will have the apparatus mounted above the conveyor 7 of a slicing machine substantially in the position shown in Fig. 1. It will be evident that the drive means for the interleaver must be operated in timed relation with the drive means for the slicing machine so that the pickup device will be in the position shown in Fig. 8 as it picks up a leaf at the time the delivery paddle 8 has delivered a slice 78 to the conveyor. While the paddle 8 is returning to its upright position to receive the next succeeding slice, the interleaver is operating to cause the pickup device thereof to deposit a divider leaf onto the slice just delivered.

The operation of the apparatus is such that a stack 27 of leaves is placed within the magazine 23. Several of the lowermost leaves will be pierced by the retaining pins 29 to prevent more than one leaf from being delivered from the bottom of the stack. As the drive shaft 58 is rotated it will rotate shaft 31 and the intermittent feed roller 30 thereon to the position thereof shown in Fig. 3 where it frictionally engages the lowermost leaf of the stack and feeds it outwardly toward the supplementary feed rolls 33 and 34. These latter rolls will then continue to feed the leaf to a position at the forward end of the platform 26.

While the delivery of the leaf is being made to the forward end of the platform the cam 70 is being operated to retract the pickup device to the position thereof shown in Fig. 8 where the relative position of the two plates 48 and 56 will be like that shown in Fig. 5. As the cams 75 and 76 operate to permit the lowering of the needle points 50 to pierce and pick up the divider leaf, their continued rotation will maintain the device substantially in its lowermost position while the drive means returns the device to the position shown in Fig. 2 immediately above a slice which has been delivered to the conveyor. Further continued rotation of cam 76 will cause a downward movement of the stripper plate 56 to strip the leaf from the needles, as shown in Fig. 6, to deposit the leaf on the slice. The operation is then continued and after a predetermined number of slices has been stacked the conveyor will move forwardly to begin a new stack whereupon the previous stack will be allowed to travel on the conveyor below the interleaver to suitable weighing or packaging stations.

Fig. 9 illustrates a modified form of the device herein described which operates in general to move either all or a part of the apparatus to a position above the slice and then retract the apparatus after a leaf has been deposited thereon. This modified form may take either of two specific forms, one in which the magazine is stationary and the remainder of the apparatus oscillates, and the other in which the magazine oscillates with the remainder of the apparatus. A further specific change would permit the magazine and feed roller to remain stationary and oscillate the remainder of the apparatus.

This form of the invention will also be provided with the side frame plates 11 and 12 which are not shown in Fig. 9 but which are utilized to mount the various shafts hereinafter described. In Fig. 9 the magazine is indicated by the numeral 80 and may have a stack 81 of leaves therein. The magazine is mounted at one end of a platform 82 and has at its rear end suitable retaining pins 83 to prevent removal of more than one leaf at a time. A drive shaft 84 has mounted thereon a cam 85 for rotation in contact with a cam bar 86 extending between the sides 87 of an oscillating framework. Adjacent the lower part of this oscillating framework there is mounted for rotation a feed roller 88 on a shaft 89. As this roller 88 is caused to rotate, the portion thereof which frictionally engages the lowermost leaf in the stack will cause that leaf to be removed from the stack and fed downwardly and outwardly to the platform 82 extending forwardly of the magazine. This lowermost leaf is then fed to a driven supplementary feed roll 90 and an idler feed roll 91 disposed therebelow. These two rollers contact each other through a suitable opening in the platform 82. The roller 90 is mounted on a shaft 92 on which there is also a gear member 93 enmeshed with a gear 94 on a shaft 95. The entire framework is mounted for oscillation about a rod 96 at the upper part of the apparatus.

Thus, if the magazine remains stationary in the position shown in Fig. 9, the cam 85 will rotate to cause movement of cam rod 86 and in turn cause an oscillatory movement of the framework. When the feed apparatus is in the position shown in Fig. 9 it is about to receive the lowermost leaf in a stack. As soon as this leaf leaves the stack and is moved between the feed rolls 90 and 91, the cam 85 will have moved the side frame members 87 and all of the parts mounted thereon, including the intermittent feed roller 88, toward the right, as viewed in Fig. 9, to a position immediately above a food slice. As the leaf leaves the rolls 90 and 91 the framework will begin its return movement away from the slice and leave the divider leaf deposited upon the slice.

If the magazine 80 is mounted on the frame members 87 for movement therewith, then the entire device will move over the slice and deposit it thereon in the same manner described above except that the magazine will also be in its relative position on the framework.

A third specific form of this modification would be to mount the magazine 80 and the intermittent feed roll 88 so that they would remain stationary while all of the other parts of the apparatus mounted on the framework would oscillate therewith.

Figure 10:
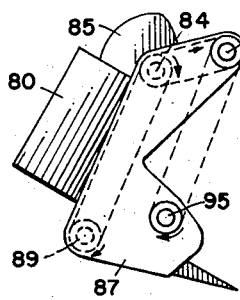
Fig. 10 is a diagrammatic illustration of the drive means for the device shown in Fig. 9 when the magazine is stationary.
Figure 11:
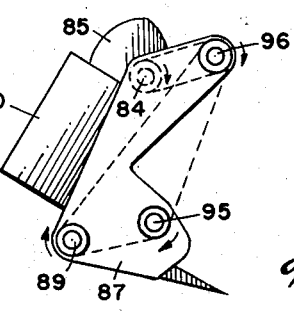
Fig. 11 is a diagrammatic illustration of the drive means of the device shown in Fig. 9 when the magazine is mounted for swinging movement.

Figs. 10 and 11 illustrate the variation in the specific form of drive means arrangement with respect to two of the specific forms of this modification. In Fig. 10 shaft 84 is the drive shaft on which the cam 85 is mounted. The magazine 80 and feed roller 88 on shaft 89 will remain stationary and only the remainder of the framework mounted on the side plates 87 will oscillate. In this case there will be a chain drive from drive shaft 84 to shaft 96 and from shaft 96 to shaft 95 which will cause rotation of the feed roll 90. Since shaft 84 and shaft 89 are both stationary relative to each other, the intermittent feed roller 88 may be driven by a chain drive from shaft 84.

In Fig. 11 there is shown a proposed drive means for the apparatus when the magazine 80 oscillates with the remainder of the framework. In this case the shafts 84 and 96 will again remain fixed relative to each other so that a suitable chain drive may pass around sprocket wheels on the respective shafts. Since, however, shaft 89 on which the intermittent roller 88 is located will also oscillate with shaft 95 about shaft 96 as an axis, a continuous chain drive may be applied to shaft 96 and around suitable sprockets on shafts 95 and 89.

If desired, the magazine 80 may also remain stationary and have all of the other parts on the framework oscillate including the shaft 89. In this event, the chain drive will still be like that shown in Fig. 11.

In all cases the platform 82 will be caused to move bodily toward the slice and will deposit the leaf on the slice as it returns in its oscillation toward the left, during which time the next succeeding slice is deposited on the divider leaf.

The present invention is designed as an improvement for the purpose of depositing individual divider leaves between the slices of a food product which are stacked as distinguished from those machines heretofore known which operate on a continuous strip of dividing material and move the same back and forth in a continuous motion as the slices are delivered thereto. The present apparatus is adapted to be used for existing slicing machines and is sufficiently simple in its construction and operation so as to render the same economical to manufacture.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. An interleaving apparatus for depositing individual leaves of a flexible material between adjacent slices of a food product comprising, a magazine for supporting a stack of said leaves, a platform adapted to support said stack and extending outwardly from one side of the magazine and perpendicular thereto, means for feeding successive leaves from the bottom of said stack and along a rectilinear path to said platform beyond said magazine, reciprocable means for transferring successive leaves from said platform to a slice positioned adjacent thereto, and means for reciprocating said last named means.

2. An interleaving apparatus for depositing individual leaves of a flexible material between adjacent slices of a food product comprising, a magazine for supporting a stack of said leaves, a platform adapted to support said stack and extending outwardly from one side of the magazine and perpendicular thereto, said platform having an opening therein, means adapted to extend through said opening for feeding successive leaves from the bottom of said stack and along a rectilinear path to said platform beyond said magazine, reciprocable means for transferring successive leaves from said platform to a slice positioned adjacent thereto, and means for reciprocating said last named means.

3. An interleaving apparatus for depositing individual leaves of a flexible material between adjacent slices of a food product comprising, a magazine for supporting a stack of said leaves, a platform at one side of said magazine, feed means for feeding successive leaves from the bottom of said stack along a rectilinear path onto said platform, and reciprocable leaf transfer means including a pickup device adapted to pick up a leaf from said platform and deposit same onto a slice positioned adjacent thereto.

4. An interleaving apparatus for depositing individual leaves of a flexible material between adjacent slices of a food product comprising, a magazine for supporting a stack of said leaves, a platform at one side of said magazine, feed means for feeding successive leaves from the bottom of said stack onto said platform, a pickup device including a pickup member and a stripper member, means for moving said pickup member into contact with a leaf on said platform and carrying said leaf to a slice positioned adjacent thereto, and means for operating said stripper member to strip the leaf from said pickup member and deposit the leaf onto said slice.

5. An interleaving apparatus for depositing individual leaves of a flexible material between adjacent slices of a food product comprising, a magazine for supporting a stack of said leaves, a platform at one side of said magazine, feed means for feeding successive leaves from the bottom of said stack onto said platform, a pickup device including a pickup member and a stripper member, cam means to move said members in unison from the pickup position thereof for picking up a leaf from said platform to a position immediately above a food slice, and other cam means for operating said stripper member to strip the leaf from said pickup member and deposit same onto said slice.

6. An interleaving apparatus for depositing individual leaves of a flexible material between adjacent slices of a food product comprising, a magazine for supporting a stack of said leaves, a platform at one side of said magazine, feed means for feeding successive leaves from the bottom of said stack onto said platform, a pickup device including a pickup member and a stripper member, a plurality of needles on said pickup member adapted to pierce a leaf on said platform and support the leaf thereon, means for moving said pickup member into contact with a leaf on said platform and carrying said leaf to a slice positioned adjacent thereto, and means for operating said stripper member to strip the leaf from said pickup member and deposit the leaf onto said slice.

7. An interleaving apparatus for depositing individual leaves of a flexible material between adjacent slices of a food product comprising, a magazine for supporting a stack of said leaves, a platform at one side of said magazine, feed means for feeding successive leaves from the bottom of said stack onto said platform, a pickup device including a pickup member and a stripper member, a plurality of needles on said pickup member adapted to pierce a leaf on said platform and support the leaf thereon, cam means to move said members in unison from the pickup position thereof for picking up a leaf from said platform to a position immediately above a food slice, and other cam means for operating said stripper member to strip the leaf from said pickup member and deposit same onto said slice.

8. An interleaving apparatus for depositing individual leaves of a flexible material between adjacent slices of a food product comprising, a pair of parallel spaced side plates mounted to pivot about a transverse rod, a platform carried by said plates, a magazine for supporting a stack of leaves, feed means for feeding successive leaves from the bottom of the stack onto said platform, means for oscillating said platform and plates back and forth from a position immediately above a food slice to a position away therefrom, and means for depositing successive leaves from the platform onto food slices disposed therebelow.

References Cited in the file of this patent

UNITED STATES PATENTS

| | | |
|---|---|---|
| 769,747 | Hoag | Sept. 13, 1904 |
| 846,850 | Hoag | Mar. 12, 1907 |

(Other references on following page)

UNITED STATES PATENTS

| | | |
|---|---|---|
| 963,946 | Saunders | July 12, 1910 |
| 1,014,323 | Morrison | Jan. 9, 1912 |
| 1,308,320 | Armstrong | July 1, 1919 |
| 1,394,613 | Drury | Oct. 25, 1921 |
| 1,821,445 | Nestor | Sept. 1, 1931 |
| 1,901,832 | Milmoe | Mar. 14, 1933 |
| 1,976,863 | Van Berkel | Oct. 16, 1934 |
| 2,566,822 | Cahill | Sept. 4, 1951 |
| 2,579,094 | Rooksby | Dec. 18, 1951 |
| 2,635,965 | Hensgen | Apr. 21, 1953 |
| 2,667,420 | Meulemans | Jan. 26, 1954 |